(12) United States Patent
Birck

(10) Patent No.: US 10,015,925 B2
(45) Date of Patent: Jul. 10, 2018

(54) SHAFT-HUB ASSEMBLY

(71) Applicant: Ademar Birck, Bahia (BR)

(72) Inventor: Ademar Birck, Bahia (BR)

(*) Notice: Subject to any disclaimer, the term of this patent is extended or adjusted under 35 U.S.C. 154(b) by 0 days.

(21) Appl. No.: 14/649,847

(22) PCT Filed: Nov. 27, 2013

(86) PCT No.: PCT/BR2013/000512
§ 371 (c)(1),
(2) Date: Jun. 4, 2015

(87) PCT Pub. No.: WO2014/085887
PCT Pub. Date: Jun. 12, 2014

(65) Prior Publication Data
US 2015/0296699 A1    Oct. 22, 2015

(30) Foreign Application Priority Data

Dec. 4, 2012 (BR) .......................... 1020120309149

(51) Int. Cl.
| | |
|---|---|
| *B27B 5/32* | (2006.01) |
| *A01B 71/02* | (2006.01) |
| *A01B 71/04* | (2006.01) |
| *F16C 3/02* | (2006.01) |
| *F16D 1/02* | (2006.01) |

(Continued)

(52) U.S. Cl.
CPC .............. *A01B 71/02* (2013.01); *A01B 71/04* (2013.01); *F16C 3/023* (2013.01); *F16C 19/548* (2013.01); *F16C 33/6607* (2013.01); *F16C 33/7886* (2013.01); *F16D 1/02* (2013.01); *F16D 1/076* (2013.01); *F16D 2250/0084* (2013.01); *Y10T 403/19* (2015.01)

(58) Field of Classification Search
CPC ..... A01B 71/02; A01B 71/04; F16C 33/6607; F16C 33/7886; F16C 19/548; F16C 3/023; F16D 1/076; F16D 1/02; F16D 2250/0084; Y10T 403/19
USPC ............... 464/178, 182, 45; 403/26; 30/347; 56/295; 83/676; 384/571
See application file for complete search history.

(56) References Cited

U.S. PATENT DOCUMENTS

| | | | |
|---|---|---|---|
| 232,432 A | 9/1880 | Allison | |
| 639,211 A | * 12/1899 | Campbell | ................ D01H 5/74 |

(Continued)

FOREIGN PATENT DOCUMENTS

| | | |
|---|---|---|
| EP | 555745 A2 | 8/1993 |
| GB | 406878 * | 3/1934 |

(Continued)

OTHER PUBLICATIONS

Feb. 11, 2014 Written Opinion and International Search Report issued in International Application No. PCT/BR2013/000512.

Primary Examiner — Gregory J Binda
(74) Attorney, Agent, or Firm — Eversheds Sutherland (US) LLP

(57) ABSTRACT

A split shaft with a setting adjustment, including a first part and a second part with threaded cylindrical sections, that may optionally also optionally include a sleeve to interconnect the first and second parts by threading. A shaft-hub unit, which includes the split shaft and a cylindrical hub with two couplable parts. Use of the split shaft and shaft-hub unit in cutting disks of planters and subsoilers, as well as in wheels of planters, is also described.

3 Claims, 7 Drawing Sheets

(51) Int. Cl.
  *F16C 33/66* (2006.01)
  *F16C 33/78* (2006.01)
  *F16C 19/54* (2006.01)
  *F16D 1/076* (2006.01)

(56) References Cited

U.S. PATENT DOCUMENTS

| | | | |
|---|---|---|---|
| 1,374,987 A * | 4/1921 | Christopherson | B60B 27/001 384/571 |
| 2,679,414 A * | 5/1954 | Hornschuch | F16D 1/02 |
| 2,698,565 A | 1/1955 | Carney | |
| 3,969,029 A | 7/1976 | Schaeffler | |
| 4,205,926 A * | 6/1980 | Carlson | E21B 17/00 |
| 4,522,515 A * | 6/1985 | Miki | F16C 19/386 384/571 X |
| 4,821,959 A * | 4/1989 | Browing | A01M 7/0042 |
| 4,832,658 A * | 5/1989 | Hendershot | F16D 3/10 464/178 X |
| 4,949,889 A | 8/1990 | Carson | |
| 5,746,555 A * | 5/1998 | McEvoy | E04C 5/165 |
| 6,257,678 B1 | 7/2001 | Brookey et al. | |
| 8,291,804 B2 * | 10/2012 | Mammel | A22B 5/205 |
| 2012/0141199 A1 | 6/2012 | Anderson, III et al. | |

FOREIGN PATENT DOCUMENTS

| | | |
|---|---|---|
| WO | 0219791 A1 | 3/2002 |
| WO | 2012055611 A1 | 5/2012 |

* cited by examiner

SHAFT-HUB ASSEMBLY

CROSS-REFERENCE TO RELATED APPLICATIONS

This application is the national stage application based on International Application PCT/BR2013/000512 filed on Nov. 27, 2013, and which claims priority to Brazilian Patent Application BR 10 2012 030914 9 filed on Dec. 4, 2012. The disclosures of the priority applications are hereby incorporated by reference herein in their entireties.

FIELD OF THE INVENTION

The present invention relates to a split shaft with adjustment setting comprising a first part and a second part of threadable cylindrical sections, and may optionally further comprise a sleeve for interconnecting the first and second parts by means of threading. The present invention also relates to the shaft-hub assembly comprising essentially said split shaft and a cylindrical hub with two coupable parts. Furthermore, the present invention refers to the use of said split shaft and shaft-hub assembly in cutting disks of planters and subsoilers, as well as wheels of planters.

BACKGROUND OF THE INVENTION

Machines and implements play an important role in agriculture. Thirty years after its introduction in the Brazilian national territory, the no-tillage system was consolidated as a conservation technology widely accepted among farmers, with systems adapted to different regions and different technological levels, from large to small farmers using animal traction.

The seeder-fertilizer or no-tillage planters are machines that perform the implementation of annual crops by sowing on land wherein no periodical preparation of the soil was performed and with the presence of vegetal coverage. There is a minimum reguired mobilization of soil, only on sowing rows. Thus, it is possible to sowing after the harvest of the previous crop. Usually the units of seeders are combined to fertilizing units, hence the name seeder-fertilizer.

The no-tillage, defined as the process of sowing in soil not revolved, in which the seed is placed in grooves or pits, with enough width and depth for the proper coverage and contact of the seeds with the earth, is today understood as a system with the following grounds, that interact:

Elimination/reduction of tillage operations. As a result, it avoids the surface sealing, due to the impact of raindrops; consequently, reduces the surface seepage and increases infiltration, drastically reducing erosion. There is more maintenance of the aggregate stability, improving the soil structure by preventing subsurface compaction. It reduces losses of water by evaporation, increasing the availability of water for plants, the biological activity of the soil and the maintenance of organic matter of the soil.

Use of herbicides for weed control. The use of desiccant herbicides means replacing the mechanical energy of soil preparation for the chemical energy (herbicide). It is essential the use of integrated weed control methods, such as the use of coverage crops, crop rotation and specific herbicides.

Formation and maintenance of mulch. It provides protection against the impact of rain drops, reducing surface runoff, sediment transport and hence erosion. It also acts on the soil protection against the effect of sunlight, reducing evaporation, the soil temperature and the thermal amplitude of the soil, and against the action of winds. With its decomposition, it incorporates organic matter to the soil, required for a larger and richer microbial activity, which allows greater nutrient recycling. In addition, it aids in weed control, by suppressing or allelopathic effect.

A precision seeder consists of chassis or tool holder bar, engaging and coupling to the tractor system, transportation system, containers for seed and fertilizer, and driving and transmission system, systems for dosage and distribution of seeds and fertilizer, sowing units, line markers and stirrups. The sowing units are formed by vegetation cutting unit, groove openers for fertilizer, groove openers for seed, depth control system of grooves for seeds, groove grounding system and compacting system of soil over seeds.

The disks cut straw and open a groove on which other components work. The most commonly used are straight, with diameters between 18" and 20".

The larger is the diameter, the greater will be the force necessary for them to penetrate the soil, because of their larger contact area. However, they have the advantage of passing on vegetation and have lower bushing problems.

The cutting blades are designed and should be regulated only for cutting straw, not exceeding a depth of more than 6 cm. Preferably, they should be provided with lateral movements, besides vertical adjustments. The deeper, the greater the unwanted mobilization of the soil. Moreover, the excess pressure causes the disk to only push the straw to the bottom of the groove, does not cutting the plant material adequately and causing the "basketing" of the seeds. The use of cutting disks in "zig zag" also helps preventing bushings; the greater the mismatch of the lines, the greater is the flow of straw between the grooves.

Document US 2012/0141199 A1 document, filed on Dec. 2, 2010, by Coupling Corporation of America, and entitled "Shaft Connection Assembly", describes a set for threaded connection of shafts in order to transfer torque between two shafts, including a hub and a rim. The hub includes a flange part and a sleeve part, the sleeve part having a plurality of sleeve segments formed by longitudinal cuts along the length of the sleeve part so that when the rim is linearly forced, axially outwardly of the flange part, the sleeve segments exert a clamping force on each of the two axes disposed within a passage formed by the hub. The clamping force prevents the relative movement of the first shaft relative to the second when the shafts are rotated around a common axis. This document presents a union scheme by means of a thread that could be adjustable, but there is no information about the existence of rollers inside, not even one can check its applicability for cutting disks of planters and subsoilers.

Document BR 8402706-1, filed on Mar. 2, 1993, by Marchesan Implements and Agricultural Machinery Tatú SA, and entitled "Cutting disk used in small and medium-size machines for no-tillage", describes a cutting disk used in small and medium-size machines for no-tillage comprising an integral support (01) defined by superior double vertical segment (02), intermediate pivoting (03), double inferior re-curved segment (04) for receiving the cutting disk (05) intermediate fastener element (06) provided with horizontal (06-A) and vertical (06-B) bushings, assembly articulation axes (07) and (08) to the front coupling (09) and rear coupling (10) for fastening the cutting disk (01) to the chassis (11) of the agricultural planter machine. A workload set of the disks for cutting and monitoring the irregularities of the ground is defined by the arrangement and constructive form of anchoring of traction spring (12) in a horizontal plane and provided with adapters (13) provided with helical conformation for insertion along with the ends wires of the traction spring (12) with screw (16) of threaded length to adjust the tension load of the traction spring (12) according to the field conditions.

Document EP 0555745, filed on Mar. 25, 2004, by Amanozen-Werke H. Dreyer GmbH & Co. Kg, and entitled "Drill Machine", describes a sower having a structure in which the disks (1) of the coulters of seeds are arranged by means of a retention arm (3), the disks (1), respectively, being rotatably mounted on the retention arms (3) via a rotary roller having an shaft, an extractor (6, 16) being arranged by means of a support (4, 15) on each side of the disk (1), the support (4) of the first separator (6), arranged on the side of the disk (1) in which the retention arm (3) is situated, being fastened to the mounting (14) of the rotary roller and/or retention arm.

The international patent application WO 2012/055611, filed on Aug. 30, 2011 by Robert Bosch GmbH, and entitled "Arrangement for transmitting torque between the shaft and the hub," describes a set (100) for transmitting torque between a shaft (48) and a hub (102), wherein the hub (102) has at least approximately the inner geometry of an eguilateral polygon with n sides (122), whose lateral surfaces are supported against an engagement part (104), which is of circular cross-section, the shaft (48), and wherein the shaft has at least one conductor part (108) which is rotatably connected with respect to the engagement part assembly (104) and extending toward a niche (124) of the polygon of n sides (122).

U.S. Pat. No. 4,494,889, filed on Jul. 14, 1983 by Reliance Electric Company, and entitled: "Shaft bushing and hub assembly" discloses a set of bearing and hub for the mounting of pulleys, sprockets, gears, joints and similar machines elements on a shaft, in which two types of conical bearing are used, the bearings having bodies with a single identical inclination used as a single hub, which is supported by both bearings. One of the bearings comprises an annular flange extending radially at the large end of the conical body and the other bearing has no flange. The screw holes and sliding holes are provided in the flange and in the interface of the bearing and of the hub for fastening the selected bearing to the hub for mounting the machine element over the shaft with screws to securely fasten the bearings on the shaft and the bore of the hub.

The Brazilian patent application BR 0900993-0 filed on Apr. 7, 2009, by Deere & Company and entitled "agricultural machine", describes an agricultural machine 10 that includes a set of disk blade with a hub and a blade disk mounted on the hub. The rotor blade is deflectable by terrain forces in an area outside of the hub. A scraper assembly includes a mounting, a scraper blade and a hinge that interconnects the pivot to the scrapper blade on the mounting. The hinge has an axis of rotation that passes through a point generally in the bottom of the perimeter of the hub, or close to it, and generally coincident with the disk blade.

U.S. Pat. No. 6,257,678, filed on Sep. 23, 1999 by Meritor Heavy Vehicle Systems, LLC, and entitled "Vehicle hub having reduced lubricant cavity", describes a vehicle hub comprising a body, usually cylindrical, which extends axially to form an inner seat of the roller, a seat of the outer bearing and between them a lubricant cavity. The hub is preferably chosen as an integral component from a ductile iron. A plurality of integral open ribs connects the body to a flange which extends radially. The ribs form an open space between the body and the ribs. The open structure of the ribs provides cooling for the bearings and lubricant, while reducing the weight without sacrificing the strength and rigidity of the hub. The cavity of the lubricant has a reduced diameter, which reduces the volume of lubricating medium required to fill the cavity and minimizes the centrifuge effect acting upon the medium.

SUMMARY OF THE INVENTION

It is an object of the present invention to provide a split shaft with adjustment setting comprising a first part and a second part, wherein said first part comprises a cylindrical section whose inner surface comprises a plurality of slots and said second part comprises a cylindrical section whose outer surface comprises a plurality of grooves, and wherein the diameter of the cylindrical section of the first part is larger than the diameter of the cylindrical section of the second part of the shaft.

It is a further object of the present invention to provide a split shaft with adjustment setting comprising a first part and a second part further comprising a central sleeve of cylindrical section comprising grooves on its inner surface, wherein the diameter of cylindrical section of said first part and second part of the shaft are equal, and the diameter of the inner cylindrical section of said sleeve is larger than the diameter of the cylindrical section of said first part and second part of the shaft.

It is also an object of the present invention to provide a shaft-hub assembly comprising:

1) said split shaft with said adjusting setting comprising a first part and a second part;

2) a cylindrical hub comprising two coupable parts, wherein said hub comprises a central portion of cylindrical section which extends axially to form an inner seat, wherein in one of the parts there are inserted and mounted the other internal parts forming shaft-hub assembly, and subsequently the other part of the hub for fastening the cutting disk. The hub further comprises a perforated section which allows insertion of lubricant across its inner surface, facilitating the rolling and minimizing wear;

3) at least two tapered rollers;

4) at least two retainers;

5) at least two dust cover, made of felt and attached to a washer; and 6) at least two rings or latches.

It is also an object of the present invention to provide the use of the split shaft at wheels of planters, and using the shaft-hub assembly in cutting disks of planters and/or subsoilers.

BRIEF DESCRIPTION OF DRAWINGS

The structure and operation of the present invention, together with further advantages thereof may be better understood by reference to the accompanying drawings and the following descriptions.

DETAILED DESCRIPTION OF THE INVENTION

Figure 1:
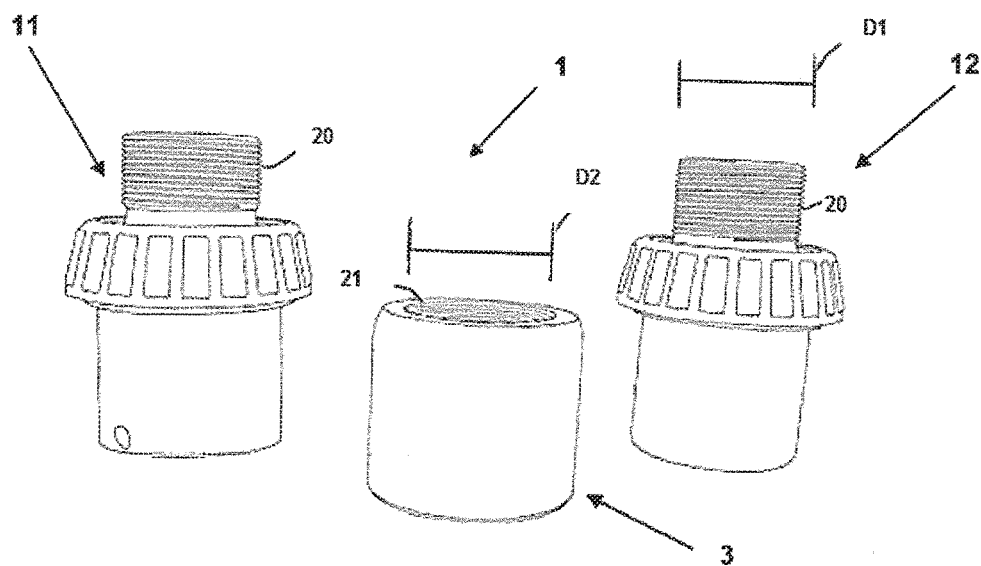
FIG. 1 illustrates a possible configuration for the split shaft of the present invention, wherein parts of said shaft are connected by means of a sleeve.
Figure 2:
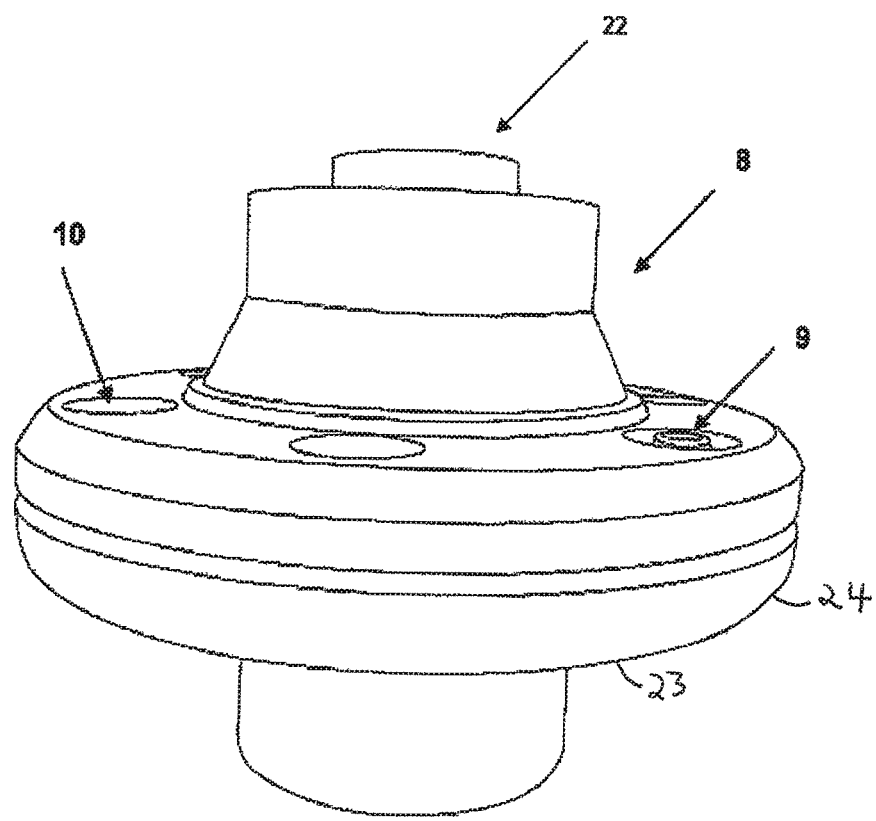
FIG. 2 shows a side view of the cylindrical hub comprising two coupable parts.
Figure 3:
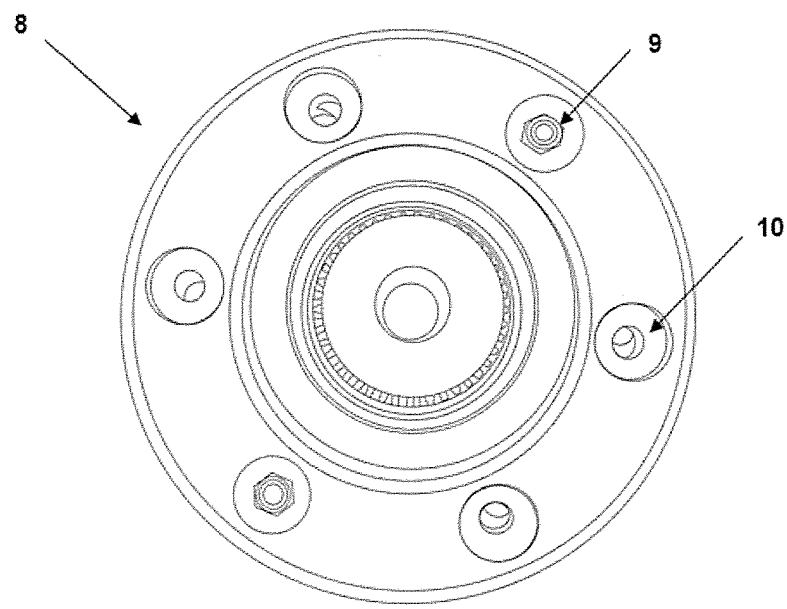
FIG. 3 shows a top view of the cylindrical hub comprising two coupable parts.
Figure 4:
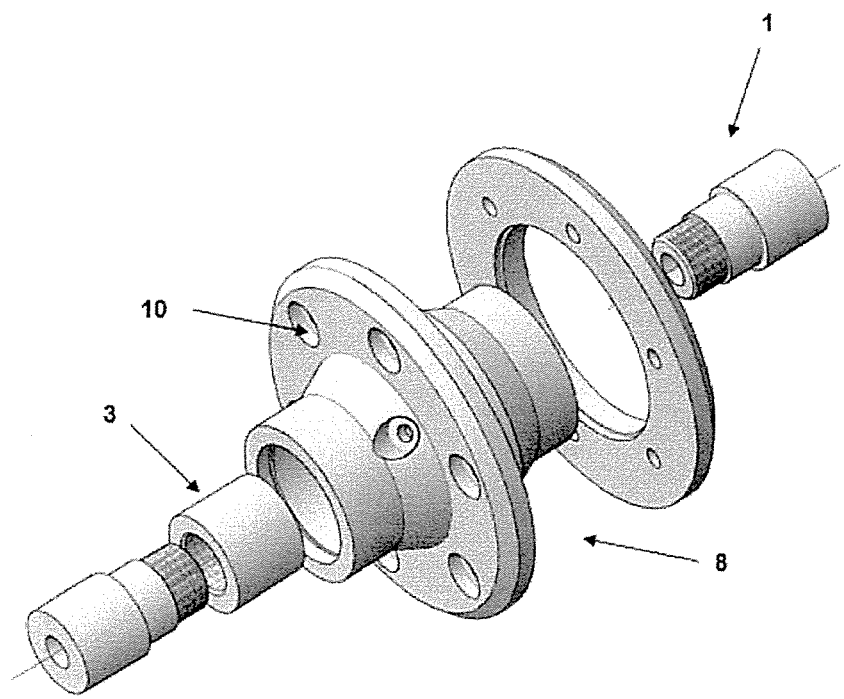
FIG. 4 shows a schematic representation of the mounting of the shaft-hub assembly.
Figure 5:
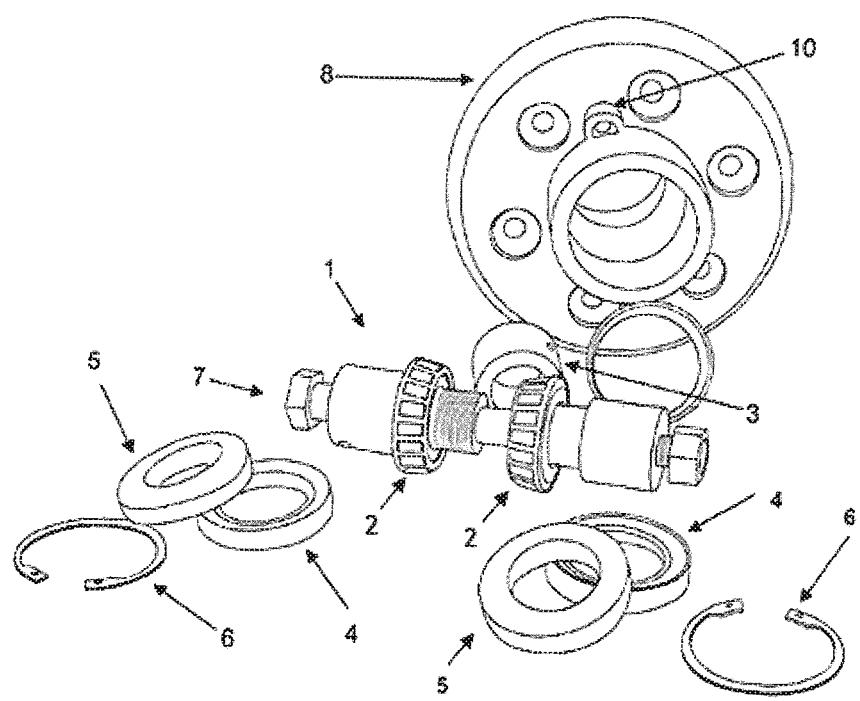
FIG. 5 shows the constituent parts of the shaft-hub assembly.
Figure 6:
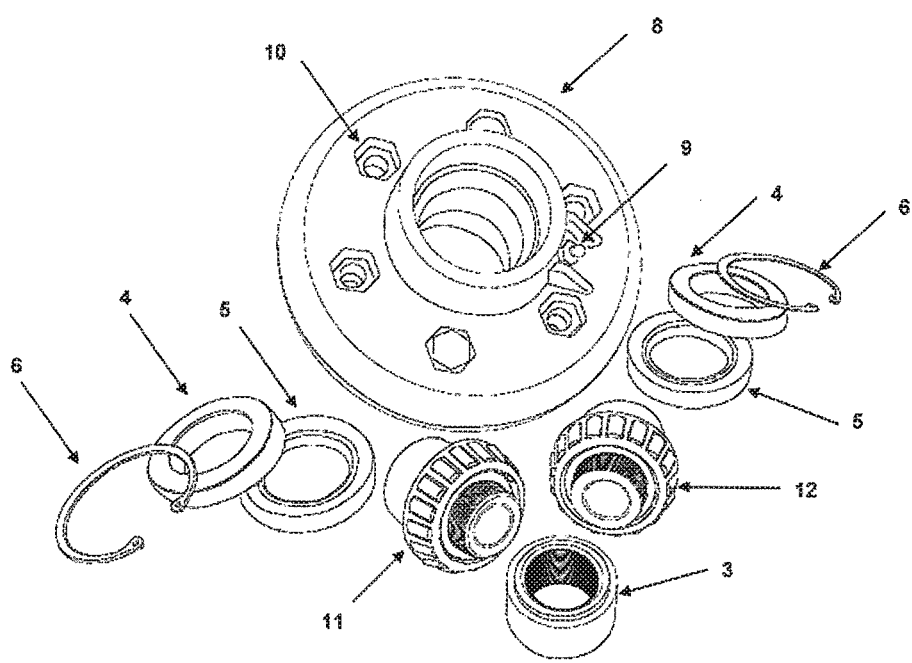
FIG. 6 shows a further view of the constituent parts of the shaft-hub assembly.
Figure 7:
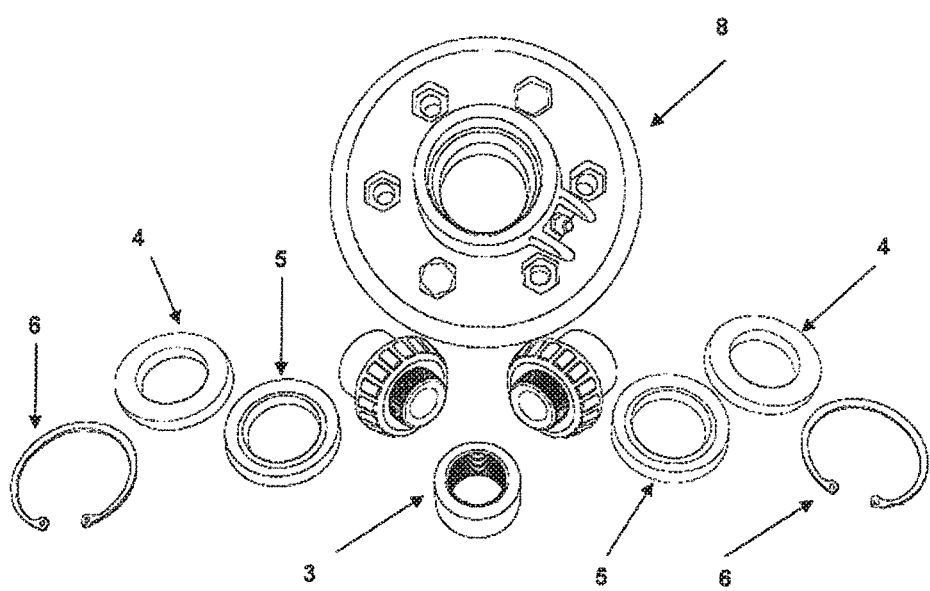
FIG. 7 shows a further view of the constituent parts of the shaft-hub assembly.
Figure 8:
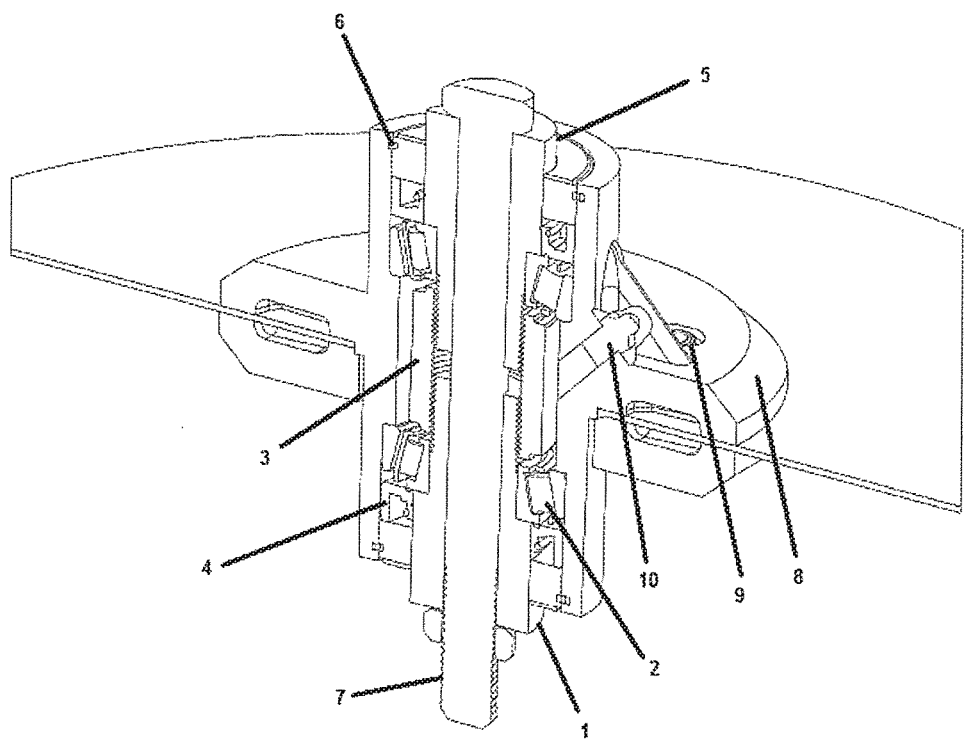
FIG. 8 is a cut away side view of the shaft-hub assembly.

Although the present invention may be susceptible to various embodiments, there are shown in the drawings and in the following detailed discussion, preferred embodiments with the understanding that the present disclosure is to be considered as an exemplification of the principles of the invention and is not intended to limit the present invention to what is illustrated and described herein.

The main approach of a first embodiment (not shown) of this invention relates to a split shaft with adjustment setting comprising a first part and a second part made of steel, wherein said first part comprises a cylindrical section whose inner surface comprises a plurality of grooves, and said second part comprises a cylindrical section whose outer surface comprises a plurality of grooves, so as to provide the threading of said first part to said second part of the shaft, and wherein the diameter of the cylindrical section of the first part is larger than the diameter of the cylindrical section of the second part of the shaft.

In a second preferred embodiment of the present invention, a split shaft 1 with adjustment setting comprising a first part 11, a second part 12 and a central sleeve (3) of a cylindrical section, wherein the diameter D1 of the first part 11 and of the second part 12 comprises grooves 20 on their outer surfaces and the central sleeve (3) comprises groves 21 on its inner surface, wherein the diameter D1 of the cylindrical section of said first part 11 and second part 12 of the shaft 1 are equal, and the diameter D2 of the cylindrical section of said sleeve 3 is greater than the diameter of cylindrical section of said first part 11 and second part 12 of the shaft 1 so as to provide the threading of said first 11 and second parts 12 of the shaft 1 at each end of the sleeve 3.

In a preferred embodiment of the present invention, there is provided a shaft-hub assembly comprising:

1) said split shaft 1 with adjustment setting comprising a first part 11 and a second part 12 made of steel;

2) a cylindrical hub 8 comprising two coupable parts, wherein said hub 8 comprises a central portion 22 of cylindrical section which extends axially to form an inner seat, wherein one of the parts are inserted and assembled to other internal parts that form the shaft-hub connection, and subsequently the other part 23 of the hub is used for fastening the cutting disk. The hub 8 further comprises a perforated section 10 which allows lubricant insertion across its whole inner surface, facilitating the rolling and minimizing wear. Hub parts are made of cast iron 24. The two parts of the cylindrical hub 8 are coupled by inserting from approximately six screws 9 around the perforations existing in both sides;

3) at least two tapered rollers 2;

4) at least two retainers 5 for retaining the lubricant grease, made of rubber;

5) at least two dust covers 4, made of felt and attached to a washer, which are used to block out dust in the lubricated inner part of the hub; and 6) at least two rings or latches 6, fitted at the ends on both sides of the hub, to prevent escape of any internal parts.

Compared to the prior art, the main differences of the shaft-hub assembly of the present invention reside in the split shafts 1, which have adjustment setting, in the type of rollers 2 that are used and in the use of dust cover 4.

By setting adjustment of the split shaft 1 of the present invention, the durability and strength of the product will be much higher, allowing the user to notice the gap that will eventually occur, and make the necessary adjustments, avoiding the rupture of the hub 8 and of the internal components, which would not be possible to make with the currently existing products on the market. The tapered rollers 2, also more resistant, are used to monitor and complement the durability of the product, since ball rollers do not meet the requirements for monitoring the progress brought by the invention. As the dust covers 4, these are extremely useful for inhibiting dust and other impurities in the lubricated part of the product, avoiding the wear caused by dryness originating from the dirt (dust), which also adds to its durability.

The assembly of the entire assembly begins by inserting the covers 4 of the rollers 2 in the inner part of the both sides of the hub 8, fastening them by pressure to the point limited by a shoulder; then, the roller 2 should be placed in one of the sides of the shaft 1, fitting it under pressure to the existing limit; later, this side of the shaft 1, already with the fastened roller 2, must be threaded in the central sleeve 3 until it touches the taper roller 2; then it must be placed the other roller 2 of the second part 12 of the shaft 1, likewise, by pressure, to the existing limit; in sequence, the part of the shaft 1 must be inserted (with the roller 2 and the sleeve 3) on one of the sides of the hub 8, by placing then the other part of the shaft 1 (with the roller 2) by the other side of the hub 8, being threaded in the sleeve 3, which will make the setting and adjustment; continuing the mounting, the retainer 5, the dust covers 4 and rings/latches 6 should be placed on both sides of the hub 8, necessarily in this sequence. Then, the hub 8 is ready, with the use of its other part, for fastening of the cutting disk of planters and subsoilers, with the use of screws 7. At the end, after the complete mounting of the hub 8 in the cutting disk, all the assembly shall be fastened on the stand of the planter or subsoiler, using a long screw that crosses the whole assembly and is fastened by a nut.

The setting is made by the split shaft 1, wherein in case of looseness in the rollers 2, causing an instability in the cutting disk, and consequently, in the whole assembly, the user can simply proceed with the adjustment/setting, returning the product stability, preventing its wear and increasing its durability.

The possibility of setting and adjustment as well as the durability of the product, are the great advantages and the major difference of this product over those existing in the market, since the user will avoid constant ruptures due to the setting and strength of the equipment, reducing costs and optimizing time use of their implements, which need not to stand still for sequential exchanges.

The application of the shaft-hub assembly can be made in cutting disks of any planters and/or subsoilers currently in the market. Additionally, the split shaft of the present invention can be used separately in wheels of planters.

Thus, although only some embodiments of the invention have been shown, it will be understood that various omissions, substitutions and changes may be made by one skilled expert in the art without departing from the spirit and scope of the invention. The described embodiments are to be considered in all aspects only as illustrative and not restrictive.

It is expressly intended that all combinations of the elements that perform the same function in substantially the same way to achieve the same results are within the scope of the invention. Substitute elements of a described embodiment to another are also fully intended and contemplated.

It is also necessary to understand that the drawings are not necessarily to scale, but they are only conceptual nature. The intention is therefore to be limited as indicated by the scope of the appended claims.

The invention claimed is:

1. A shaft-hub assembly comprising:
1) a split shaft;
   the split shaft comprising:
   a first part,
   a second part, and
   a central sleeve of a cylindrical section, wherein the first part and the second part comprise grooves on their outer surfaces and the central sleeve comprises grooves on its inner surface, wherein a diameter of said first part and a diameter said second part of the shaft are equal, and a diameter of the cylindrical section of said sleeve is greater than the diameter of the said first part and said second part of the shaft;
2) a cylindrical hub comprising two couplable parts;
3) at least two tapered rollers;
4) at least two retainers that are configured to retain a lubricant grease;
5) at least two dust covers that are configured to block dust from entering an internal lubricated part of the hub; and
6) at least two rings or latches fitted at ends of the two parts of the hub to prevent escape of any internal parts, wherein said cylindrical hub further comprises a perforated section.

2. The shaft-hub assembly according to claim 1, wherein the parts of said hub are made of cast iron.

3. The shaft-hub assembly according to claim 1, wherein the two parts of the cylindrical hub are coupled by inserting screws in the perforated section of said hub.

* * * * *